(12) United States Patent
Van Der Westhuizen et al.

(10) Patent No.: US 10,416,852 B2
(45) Date of Patent: Sep. 17, 2019

(54) DISPLAY AND INTERACTION METHOD IN A USER INTERFACE

(71) Applicant: Flow Labs, Inc., Menlo Park, CA (US)

(72) Inventors: Willem Morkel Van Der Westhuizen, Stellenbosch (ZA); Filippus Lourens Andries Du Plessis, Stellenbosch (ZA)

(73) Assignee: Flow Labs, Inc., Menlo Park, CA (US)

( * ) Notice: Subject to any disclaimer, the term of this patent is extended or adjusted under 35 U.S.C. 154(b) by 0 days.

(21) Appl. No.: 15/556,960

(22) PCT Filed: Mar. 11, 2016

(86) PCT No.: PCT/IB2016/051388
§ 371 (c)(1),
(2) Date: Sep. 8, 2017

(87) PCT Pub. No.: WO2016/142911
PCT Pub. Date: Sep. 15, 2016

(65) Prior Publication Data
US 2018/0052575 A1   Feb. 22, 2018

(30) Foreign Application Priority Data

Mar. 12, 2015 (ZA) .................. 2015/01682

(51) Int. Cl.
*G06F 3/0484* (2013.01)
*G06F 3/0488* (2013.01)
*G06F 3/0482* (2013.01)

(52) U.S. Cl.
CPC .......... *G06F 3/0484* (2013.01); *G06F 3/0482* (2013.01); *G06F 3/0488* (2013.01)

(58) Field of Classification Search
CPC ..... G06F 3/0484; G06F 3/0488; G06F 3/0482
See application file for complete search history.

(56) References Cited

U.S. PATENT DOCUMENTS

| 2007/0125633 A1* | 6/2007 | Boillot | ................... G06F 3/011 200/52 R |
|---|---|---|---|
| 2009/0046061 A1 | 2/2009 | Denoue et al. | |

(Continued)

FOREIGN PATENT DOCUMENTS

| WO | WO 2014/188283 A2 | 11/2014 | |
|---|---|---|---|
| WO | WO-2014188283 A2 * | 11/2014 | ............. G06F 3/048 |

OTHER PUBLICATIONS

Patent Cooperation Treaty, International Search Report, International Patent Application No. PCT/IB2016/051388, dated Jul. 26, 2016, 2 Pages.

(Continued)

*Primary Examiner* — Jonathan A Boyd
(74) *Attorney, Agent, or Firm* — Fenwick & West LLP (57) ABSTRACT

A display and interaction method in a user interface is provided. The user interface includes a touch-sensitive display, and can track a position and/or movement of a pointer along a z-axis that extends normally from the display. An interactive item is displayed on the display, and selection of the interactive item is received from the pointer. The position and movement of the pointer along the z-axis relative to the selected interactive item is tracked, and the display of at least one additional selectable option associated with the interactive item is initiated based thereon.

12 Claims, 7 Drawing Sheets

(56) References Cited

U.S. PATENT DOCUMENTS

2012/0280931 A1 11/2012 Stephanick et al.
2014/0152603 A1 6/2014 Algreatly

OTHER PUBLICATIONS

Patent Cooperation Treaty, Written Opinion of the International Searching Authority, International Patent Application No. PCT/IB2016/051388, dated Jul. 26, 2016, 6 Pages.

* cited by examiner

DISPLAY AND INTERACTION METHOD IN A USER INTERFACE

CROSS-REFERENCE TO RELATED APPLICATIONS

This application claims priority from South African provisional patent application number 2015/01682 filed on 12 Mar. 2015, which is incorporated by reference herein.

FIELD OF THE INVENTION

This invention relates to a display and interaction method in a user interface and more particularly, to a user interface that includes a touch-sensitive display.

BACKGROUND TO THE INVENTION

Touch sensitive displays have gained in popularity over point and click displays. In point and click displays, a cursor or pointer is controlled by a mouse, scroll pad or scroll wheel, whereas in touch sensitive displays, a user interacts with a target interactive item using a finger or fingers or with a tool such as a stylus or other pointing object. The target interactive item may, for example, be an icon, a menu item, a hypertext link, a button or any other target positioned in a display region of the touch sensitive display. Throughout this specification, the term "interactive item" should be broadly interpreted and is used to refer to any target provided by a user interface and which a user may wish to select.

While a mouse, scroll pad or scroll wheel may have several buttons to enable the user to apply different selection modes, such as a "right click" selection mode, with touch sensitive displays there may only be one selection mode available when a user interacts with a target interactive item. Right clicking is a particularly useful function in point and click displays where a short list of options may be displayed in respect of a target interactive item. While some touch sensitive displays enable users to indicate a different intent by pressing on a target interactive item for an extended period of time, this does not replace the usefulness of the right click selection mode as it is a generally slow interaction method.

It would be advantageous to enable a user of a touch-sensitive display to interact with a target interactive item such that more than one selection mode is available.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with the invention there is provided a display and interaction method in a user interface that includes a touch-sensitive display and is capable of tracking position and/or movement of a pointer along a z-axis that extends normally from the display, the method comprising the steps of:
 displaying an interactive item on the display;
 receiving a selection of the interactive item from the pointer;
 tracking the position and/or movement of the pointer along the z-axis relative to the selected interactive item; and
 responsive to movement and/or position of the pointer along the z-axis, initiating display of at least one additional selectable option associated with the interactive item.

Further features provide for the position of the pointer to relate to a distance from the display; and for the movement to relate to a direction towards or away from the display.

Still further features provide for the method to include, in response to the pointer crossing a selection threshold at a certain distance along the z-axis, selecting the interactive item without selecting any additional selectable option; and, in response to the pointer staying within the selection threshold distance, enabling the selection of the one or more additional selectable options.

Yet further features provide for the method to include, responsive to enabling the selection of the one or more additional selectable option, selection of the additional selectable option by the touching of the pointer to the display at the displayed option.

Further features provide for the step of displaying of the at least one additional selectable option to be initiated only once the pointer crosses a first threshold at a certain distance from the display along the z-axis and the direction of movement of the pointer has reversed so that the pointer moves closer to the display, where the first threshold is closer to the display than the selection threshold.

Still further features provide for the method to include dynamically resizing or repositioning the interactive item responsive to the position of the pointer along the z-axis away from the display.

Yet further features provide for the size or position of the interactive item to reach a maximum size or final position once the pointer has crossed the first threshold, so as to provide a user of the user interface with intuitive feedback as to when the threshold has been crossed.

Further features provide for a second interaction mode to be entered once the display of the at least one additional selectable option has been initiated, the second interaction mode enabling the selection of the one or more additional selectable option without the disappearance of the additional selectable options when the position of the pointer along the z-axis crosses the first threshold in either direction.

Still further features provide for a display function to be provided when the second interaction mode has been entered wherein a movement of the pointer in a direction along an x-y plane of the display causes the additional selectable options to move in the opposite direction on the display so that an additional selectable option can be reached for selection with a relatively small movement in the x-y plane.

Yet further features provide for the additional selectable options to be dynamically updated in response to the pointer moving along the z-axis away from the display, and for a second interaction mode to entered into only once the direction of movement of the pointer along the z-axis has changed so as to move towards the display, the second interaction mode preventing further changing of the displayed additional selectable options.

The invention extends to a user interface comprising:
 a touch-sensitive display that includes a display component for displaying an interactive item on the touch-sensitive display;
 a z-axis tracking component that is capable of tracking position and/or movement of a pointer along a z-axis that extends normally from the display;

a touch sensitive input receiving component that receives a selection of the interactive item from the pointer; and a display initiating component;

wherein, responsive to movement and/or position of the pointer along the z-axis relative to the selected interactive item, the display initiating component initiates display of at least one additional selectable option associated with the interactive item.

The invention further extends to a computer program product providing a display and interaction method in a user interface that includes a touch-sensitive display and is capable of tracking position and/or movement of a pointer along a z-axis that extends normally from the display, the computer program product comprising a non-transitory computer-readable medium having stored computer-readable program code, the computer-readable program code executable by a processing circuit to perform the steps of:

displaying an interactive item on the display;

receiving a selection of the interactive item from the pointer;

tracking the position and/or movement of the pointer along the z-axis relative to the selected interactive item; and responsive to movement and/or position of the pointer along the z-axis, initiating display of at least one additional selectable option associated with the interactive item.

An embodiment of the invention will now be described, by way of example only, with reference to the accompanying drawings.

DETAILED DESCRIPTION WITH REFERENCE TO THE DRAWINGS

Electronic devices have been developed which have touch sensitive displays extending in an x-y plane which have widespread use and functionality. In addition more recently, displays have been developed with proximity sensors which provide z-axis tracking along a z-axis which extends normally to the x-y plane. Z-axis tracking enables an electronic device to track the position and/or movement of a pointer above at least a portion of the touch-sensitive display of a user interface. Position of the pointer along the z-axis relates to a distance from the display, and movement along the z-axis relates to movement towards or away from the display.

One example of proximity sensors is infrared proximity sensors. These sensors emit infrared light, which is reflected back thereto by an object hovering above the display. Interpretation of the reflected signal is used by the infrared sensor to detect hovering and/or movement of an object such as a finger, palm or the like. A photodiode amplifier output change may allow such detection. As a result, hovering or z-axis location may be used as an additional method of providing input to an electronic device. It should be noted that more than one proximity sensor may be employed by a single electronic device.

Figure 1:
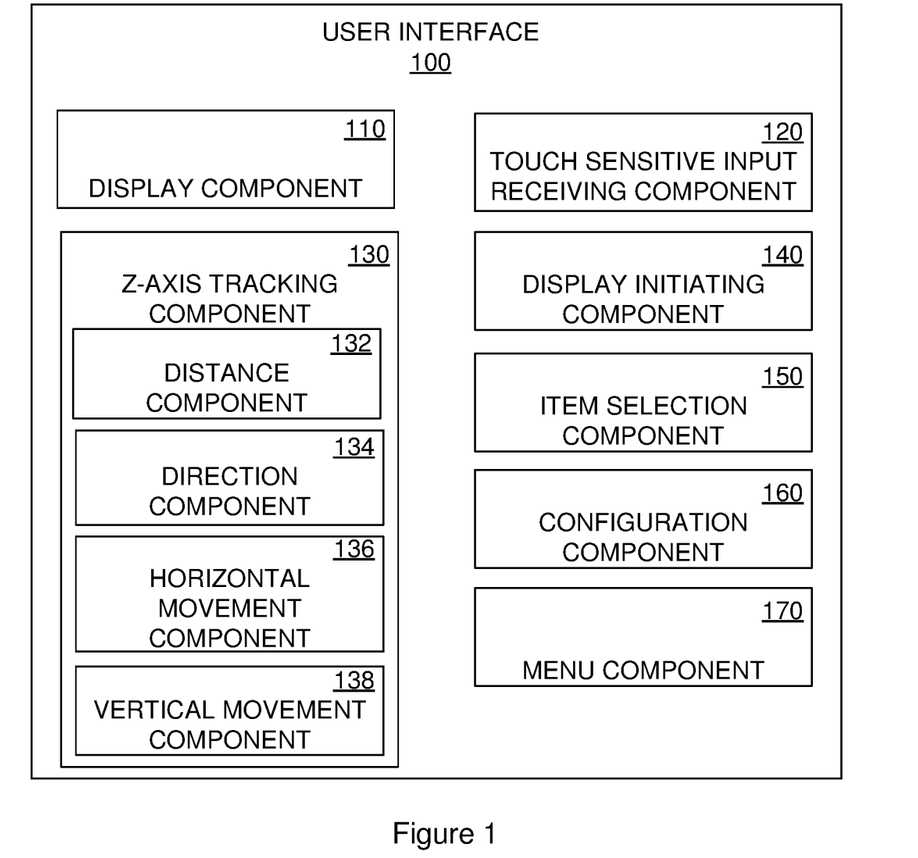
FIG. 1 is a block diagram illustrating logical components of an embodiment of a user interface according to the invention.

Logical components of an embodiment of a user interface (100) of an electronic device according to a first embodiment are illustrated in FIG. 1. It should be noted that the user interface may be implemented at least partially in software, the software configured to allow hardware components of the electronic device to perform the necessary steps in the method.

The user interface (100) may be associated with a processor for executing the functions of components described below, which may be provided by hardware or by software units executing on the processor. The software units may be stored in a memory component and instructions may be provided to the processor to carry out the functionality of the described components.

The user interface (100) has a display component (110), a touch sensitive input receiving component (120), a z-axis tracking component (130), and a display initiating component (140). An item selection component (150), configuration component (160) and menu component (170) also form part of the user interface (100). The display component (110) is configured to display at least one interactive item on a display associated with the user interface (100). The touch sensitive input receiving component (120) is configured to receive input from a touch-sensitive display associated with the user interface (100), and the item selection component (150) is configured to select an interactive item based on the input received from the input receiving component (120).

The z-axis tracking component (130) is configured to track a pointer, for example a finger of a user, located above the display, and includes a distance component (132), a direction component (134), a horizontal movement component (136) and a vertical movement component (138). The distance component (132) is configured to track the distance of the pointer above the display. The direction component (134) may interpret data originating from the distance component (132) to determine the direction of movement of the pointer, whether away from or towards the display. The implication of the direction of movement will be expanded on below. The horizontal movement component (136) and vertical movement component (138) are configured to track movement of the pointer in the horizontal and vertical directions, or x-axis direction and y-axis direction, respectively.

The configuration component (160) may configure parameters of the method, including threshold values used during operation of the method, to determine which interactive items the method is applied to, and the like. The menu component (170) may configure menus and additional interactive options that may be presented during operation of the method. This will be expanded on further below.

Figure 2:
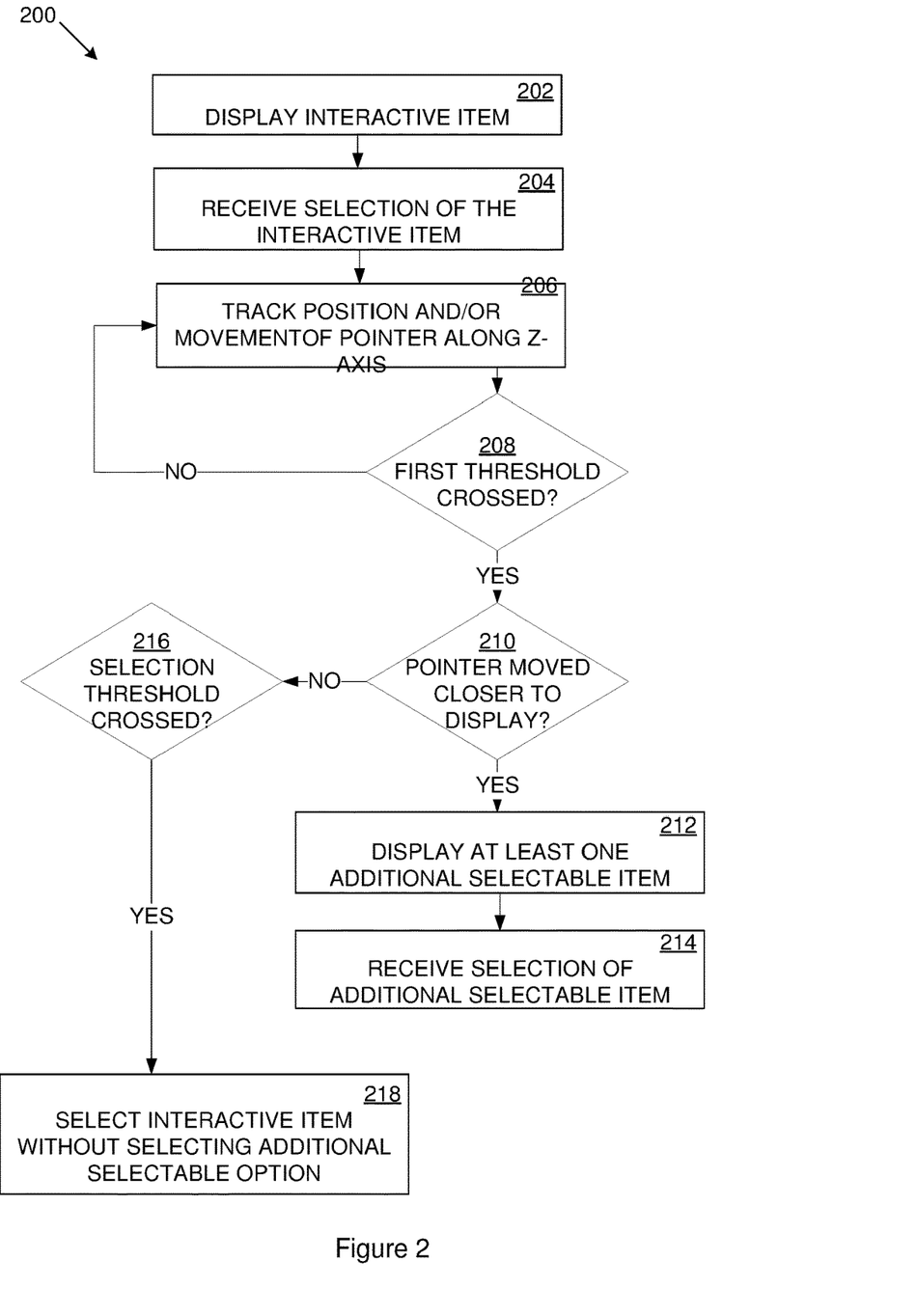
FIG. 2 is a flow diagram illustrating a method of display and interaction in a user interface according to a first exemplary embodiment of the invention.

A flow diagram (200) of FIG. 2 illustrates an exemplary display and interaction method carried out at the exemplary user interface (100) described with reference to FIG. 1.

An interactive item is displayed (202) on the display component (110) of the user interface. A selection of the interactive item is received (204) from a pointer via the touch sensitive input receiving component (120) and the item selection component (150). For example, a selection of a displayed icon for an application may be received by means of a user of the electronic device touching a finger on the displayed icon, the finger serving as pointer. Next, the position and/or movement of the pointer along the z-axis is tracked (206) by the z-axis tracking component (130). The distance component (132) tracks the distance of the pointer above the display. The direction component (134) tracks the direction of movement of the pointer. The horizontal movement component (136) tracks movement of the pointer in a horizontal direction, while the vertical movement component (138) tracks movement of the pointer in a vertical direction.

If a first threshold at a certain distance along the z-axis is crossed (208), then the pointer is tracked to determine if the direction of movement of the pointer has reversed so that the pointer moves closer (210) to the display. The configuration component (160) typically determines the first threshold value. If the direction of movement of the pointer has reversed, the display initiating component (140) initiates (212) the display of at least one additional selectable option associated with the interactive item. In a situation where the additional options are menu items, the menu component (170) may determine the options to be displayed. This may include providing specific menu items depending on the type of interactive item is initially selected. A selection of the additional item is received (214) by the touch sensitive input receiving component (120) and item selection component (150) in a final stage.

If the direction of movement of the pointer does not reverse but continues to move away from the display so that it crosses (216) a selection threshold, then at a final stage the displayed interactive item is selected (218) without selecting any additional selectable option. Once again, the selection threshold is determined by the configuration component (160).

Figure 3A:
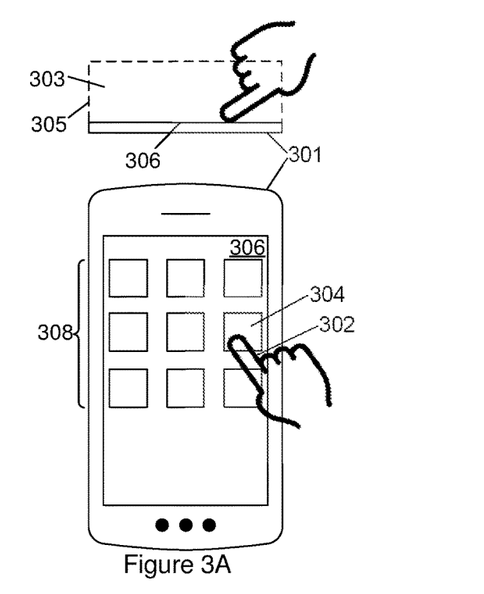
FIGS. 3A to 3F are schematic illustrations of a series of steps conducted in the first exemplary method of display and interaction in a user interface according to the invention.

In FIG. 3A, the finger (302) selects an interactive item (304) displayed on the touch sensitive display (306). It will be appreciated that the electronic device could be any device with a touch sensitive display such as a tablet computer, phablet, control panel of machinery or equipment or the like. The interactive item (304) in this embodiment is an icon associated with an application ("app") on the mobile phone, and is selected from a group of icons (308) displayed on a home screen of the mobile phone. The selection is made by the user's finger (302) touching the screen above the displayed app icon (304).

Figure 3B:
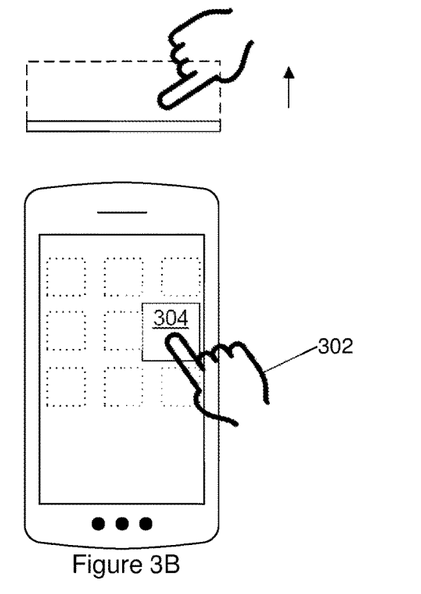
Figure 3C:
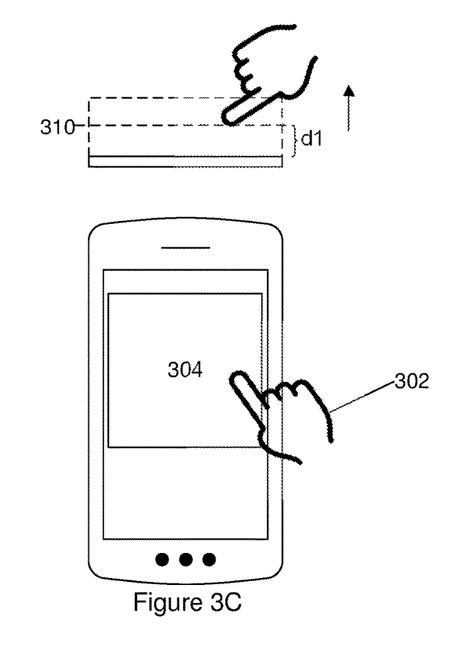

FIG. 3B shows a next stage in the display and interaction method. Here, the user has moved the finger (302) away from the display in the direction of the z-axis. In response, the app icon (304) has resized and the other icons (308) have greyed out in the background. FIG. 3C shows a next stage in the method where the user has continued moving the finger (302) away from the display until a first threshold (310) at a distance d1 from the display is reached. At this point, the app icon (304) has reached a maximum size so as to provide the user with intuitive feedback as to when the first threshold has been crossed. In this illustration, the app icon (304) substantially fills the display.

Figure 3D:
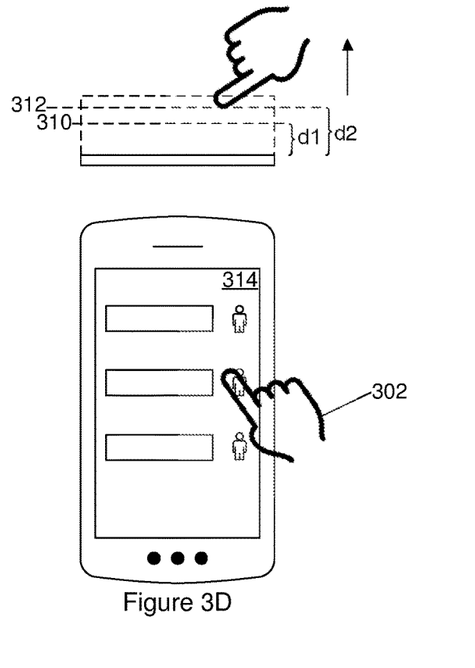

If the user keeps moving the finger (302) further away from the display in the direction of the z-axis, then a selection threshold (312) at a distance d2 from the display is crossed as shown in FIG. 3D, and the app icon (304) is selected so as to launch an app (314) represented by the app icon (304). The user is then able to further interact with the app (314) in a conventional manner.

Figure 3E:
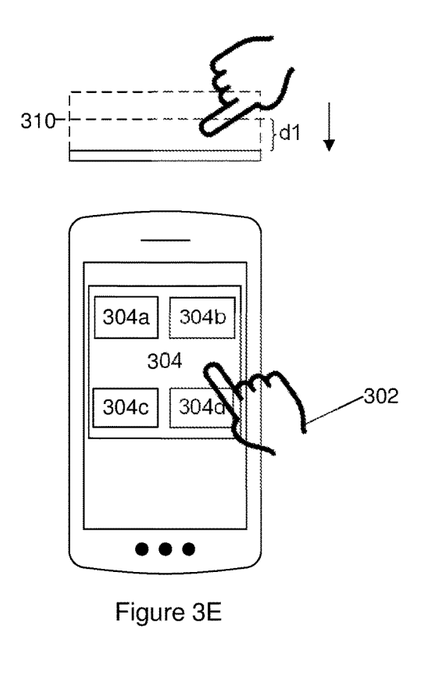

If, however, instead of moving the finger (302) further away from the display as shown in FIG. 3D, the user instead moves the finger back towards the display as shown in FIG. 3E so that the finger crosses the first threshold (310), the display of a number of additional selectable options (304a, 304b, 304c, 304d) associated with the interactive item are initiated. The additional selectable options may be popular shortcuts associated with the interactive item, such as popular landing pages within the app (314). In one illustration, if the app icon (304) is a Facebook® icon, the additional selectable options (304a, 304b, 304c, 304d) may be "post photo", "update status", "check newsfeed" and "add friend", for example.

Once the additional selectable options are displayed, a second interaction mode is entered that enables the selection of the one or more additional selectable options without the disappearance of the additional selectable options when the position of the pointer along the z-axis crosses the first threshold (310) in either direction. The user can now move the finger (302) in the x-y direction so as to reach one of the additional selectable options. Preferably, in the second interaction mode shown in FIG. 3E, a display function is provided in which movement of the pointer in a direction in the x-y plane of the display causes the additional selectable options to move in the opposite direction on the display so that an additional selectable option can be reached for selection with a relatively small movement in the x-y plane. This may be particularly useful where finger is a thumb which may have a limited range of motion over the display.

Figure 3F:
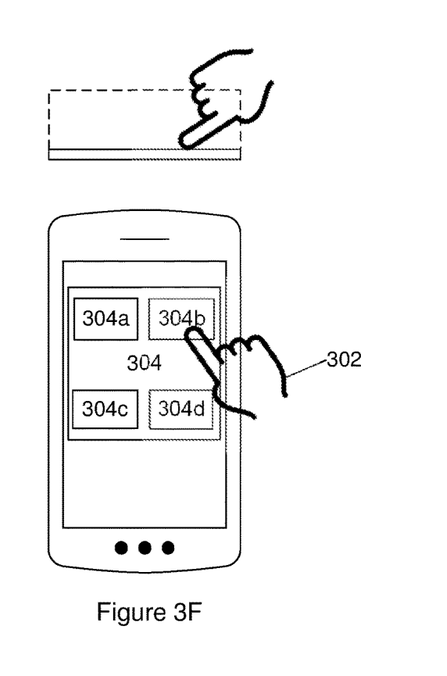

One of the additional selectable options (304b) is thereby selected, as illustrated in FIG. 3F. When the additional selectable option (304b) is selected, the app (314) is then opened with the preferred selected option. For example, if "post photo" option is selected, the app (314) may immediately access a camera app so as to take a photo which will then be uploaded to Facebook®.

It will be appreciated that the illustrated display and interaction method allows a fast and seamless selection of additional options in respect of an interactive item, if desired, by utilizing position and movement in the z-axis.

The invention is not limited to the described embodiment. For example, instead of waiting until the first threshold is crossed before displaying the additional selectable options, the user interface could start spawning options from when the finger is lifted from the interactive item. FIGS. 4A to 4D illustrate such an alternative embodiment.

Figure 4A:
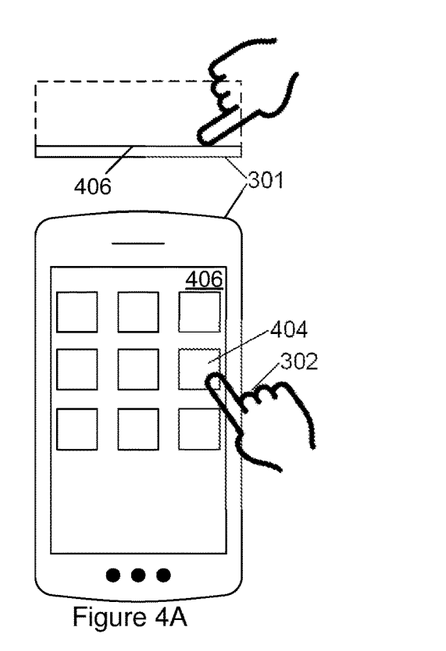
FIGS. 4A to 4D are schematic illustrations of a series of steps conducted in a second exemplary method of display and interaction in a user interface according to the invention.
Figure 4B:
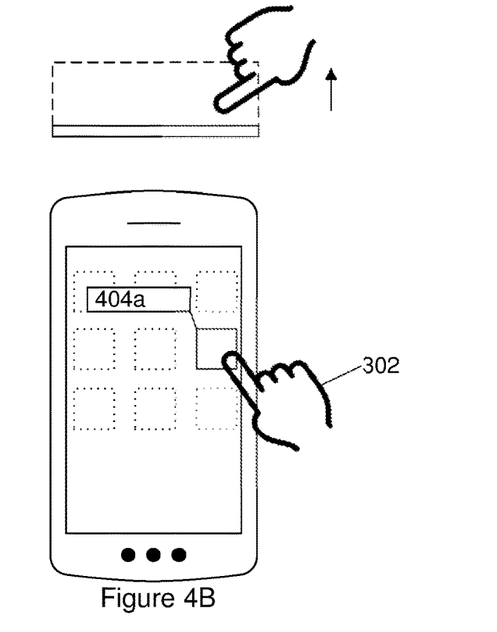
Figure 4C:
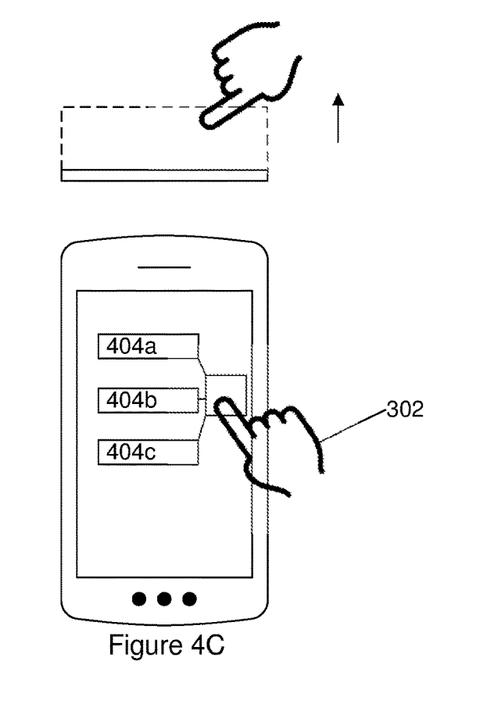
Figure 4D:
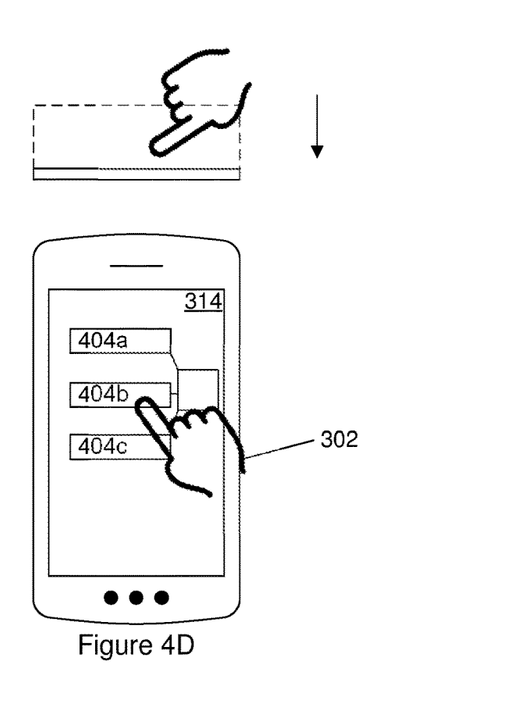

In FIG. 4A, a user's finger (302) selects an interactive item (404) displayed on a touch sensitive display (406) of an electronic device. As the finger (302) moves away from the display in the direction of the z-axis, a first selectable option (404a) is displayed as shown in FIG. 4B. Moving the finger further along the z-axis causes further selectable options (404b, 404c) to be displayed, as shown in FIG. 4C. The selectable options could, for example, be preferred options shown in order of popularity. Once the desired selectable option is displayed, the user can move the finger in the x-y direction to select the selectable option (404b), as shown in FIG. 4D. Preferably, once the direction of movement of the pointer along the z-axis changes so as to move towards the display, a second interaction mode is entered into which prevents further changes of the displayed additional selectable options. As in the previous example, if the finger is lifted from the display without changing direction then the interactive item itself (404) is selected without selecting any additional selectable option.

A display and interaction method in a user interface and a user interface configured to carry out such a method is therefore provided. The method allows an electronic device to display additional selectable options associated with a target interactive item and allow efficient selection of such additional selectable options. The method and interface of the present invention may provide greater efficiency in human-computer interaction in that the interface continuously responds to movement and/or positioning of a pointer before a user ultimately makes a selection. This may simplify and/or enhance such interaction, as interactive items displayed are adapted according to the intention of the user by tracking position and movement.

Figure 5:
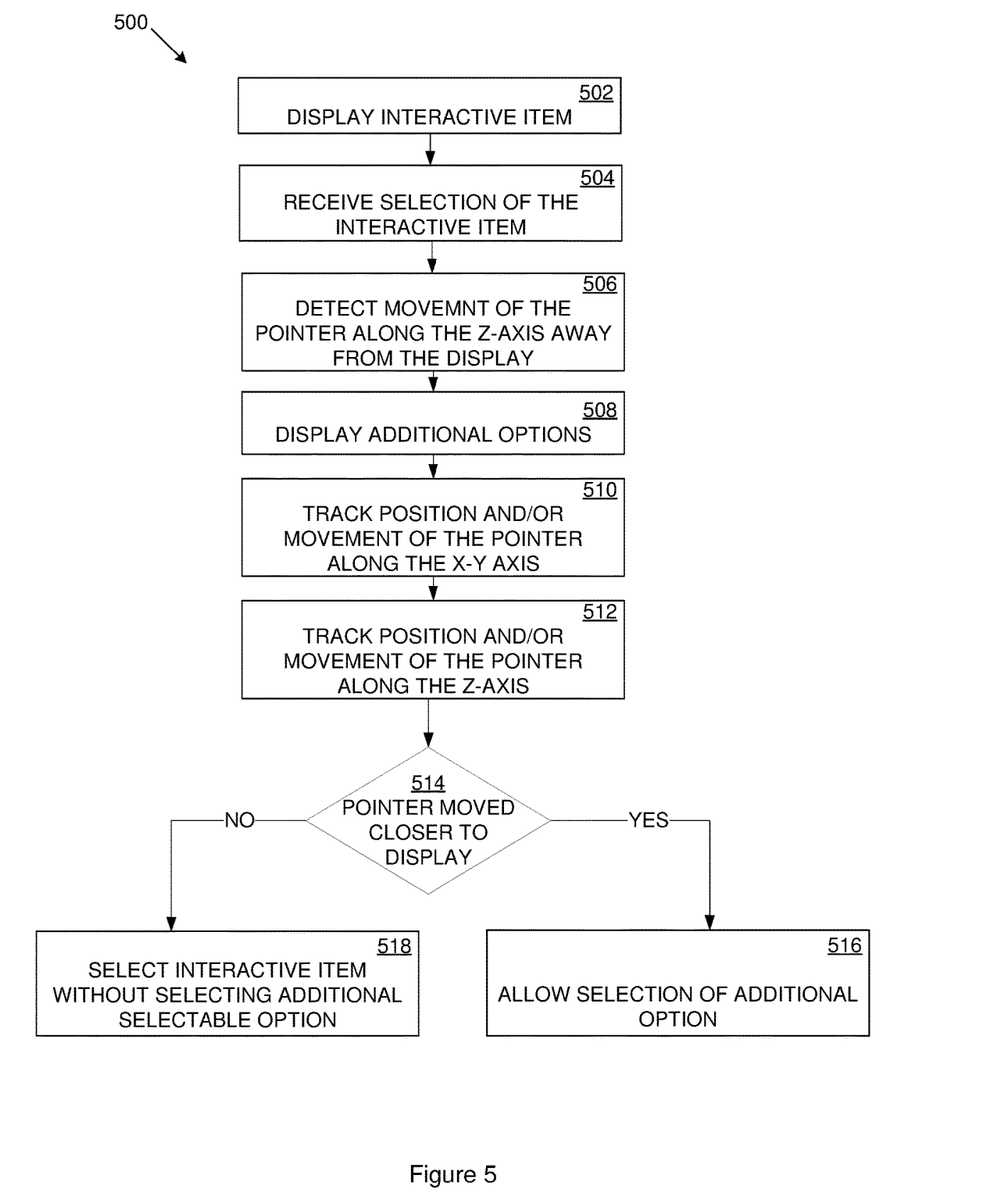
FIG. 5 is a flow diagram illustrating a method of display and interaction in a user interface according to the second exemplary embodiment of the invention.

FIG. 5 shows a flow diagram (500) illustrating a method of display and interaction in a user interface according to the exemplary embodiment described with reference to FIGS. 4A to 4D.

An interactive item is displayed (502) on the display component (110) of the user interface. A selection of the interactive item is received (504) from a pointer by the touch sensitive input receiving component (120). For example, a selection of a displayed icon for an application may be received by means of a user of the electronic device touching a finger on the displayed icon, the finger serving as pointer. Next, the position and/or movement of the pointer along the z-axis away from the display is tracked (206) by the z-axis tracking component (130). As before, the distance component (132) tracks the distance of the pointer above the display. The direction component (134) tracks the direction of movement of the pointer.

As movement of the pointer away from the display is detected (506), more options are displayed (508) on the display. The horizontal movement component (136) tracks (510) movement of the pointer in a horizontal, X-direction, while the vertical movement component (138) tracks (510) movement of the pointer in a vertical, Y-direction. Movement of the pointer in the Z-direction is still tracked (512).

If it is detected (514) that the pointer reverses direction, and moves back towards the display, the user is allowed (516) to select one of the options on the display by touching the touch-sensitive display with their finger. The horizontal and vertical movement components may track the position of the pointer towards the desired option.

If it is detected (514) that the pointer continues to move away from the display, the initially selected interactive item is selected (518) instead of any of the additional options.

A display and interaction method in a user interface as described herein provides a technical tool for efficient selection of options relating to an item in a user interface. The format of the interactive items displayed and the interaction of the user with the items provides an effective means of selection with minimal movement of a pointer.

The electronic device may include a processor for executing the functions of components described below, which may be provided by hardware or by software units executing on the electronic device. The software units may be stored in a memory component and instructions may be provided to the processor to carry out the functionality of the described components.

Figure 6:
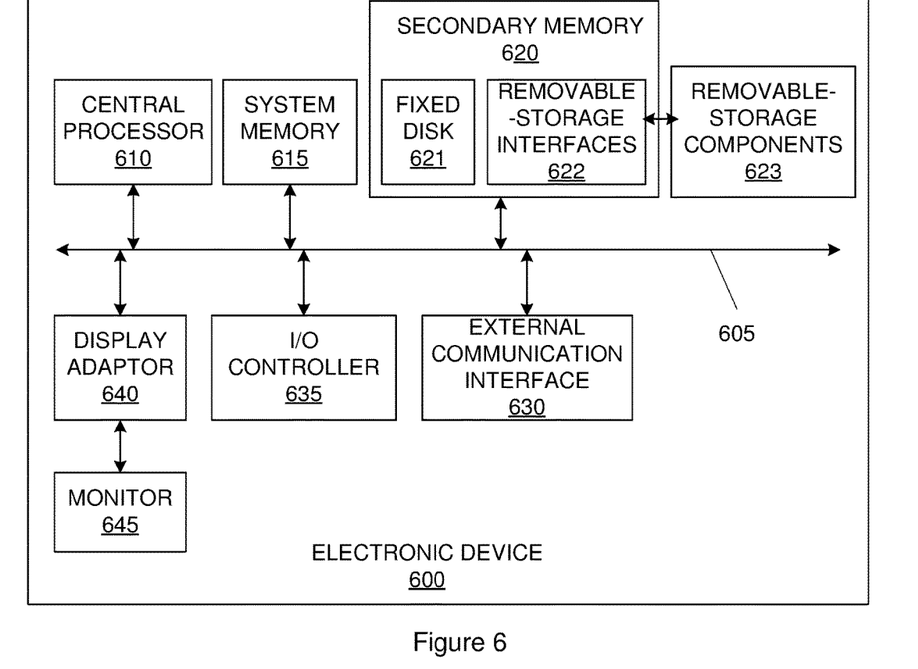
FIG. 6 illustrates an example of an electronic device in which various aspects of the disclosure may be implemented.

FIG. 6 illustrates an example of an electronic device (600) in which various aspects of the disclosure may be implemented. The electronic device (600) may be suitable for storing and executing computer program code. The various participants and elements in the previously described system diagrams, for example various electronic devices, may use any suitable number of subsystems or components of the electronic device (600) to facilitate the functions described herein. The electronic device (600) may include subsystems or components interconnected via a communication infrastructure (605) (for example, a communications bus, a cross-over bar device, or a network). The electronic device (600) may include one or more central processors (610) and at least one memory component in the form of computer-readable media. In some configurations, a number of processors may be provided and may be arranged to carry out calculations simultaneously. In some implementations, a number of electronic devices (600) may be provided in a distributed, cluster or cloud-based computing configuration and may provide software units arranged to manage and/or process data on behalf of remote devices.

The memory components may include system memory (615), which may include read only memory (ROM) and random access memory (RAM). A basic input/output system (BIOS) may be stored in ROM. System software may be stored in the system memory (615) including operating system software. The memory components may also include secondary memory (620). The secondary memory (620) may include a fixed disk (621), such as a hard disk drive, and, optionally, one or more removable-storage interfaces (622) for removable-storage components (623). The removable-storage interfaces (622) may be in the form of removable-storage drives (for example, magnetic tape drives, optical disk drives, etc.) for corresponding removable storage-components (for example, a magnetic tape, an optical disk, etc.), which may be written to and read by the removable-storage drive. The removable-storage interfaces (622) may also be in the form of ports or sockets for interfacing with other forms of removable-storage components (623) such as a flash memory drive, external hard drive, or removable memory chip, etc.

The electronic device (600) may include an external communications interface (630) for operation of the electronic device (600) in a networked environment enabling transfer of data between multiple electronic devices (600). Data transferred via the external communications interface (630) may be in the form of signals, which may be electronic, electromagnetic, optical, radio, or other types of signal. The external communications interface (630) may enable communication of data between the electronic device (600) and other electronic devices including servers and external storage facilities. Web services may be accessible by the electronic device (600) via the communications interface (630). The external communications interface (630) may also enable other forms of communication to and from the electronic device (600) including, voice communication, near field communication, radio frequency communications, such as Bluetooth™, etc.

The computer-readable media in the form of the various memory components may provide storage of computer-executable instructions, data structures, program modules, software units and other data. A computer program product may be provided by a computer-readable medium having stored computer-readable program code executable by the central processor (610). A computer program product may be provided by a non-transient computer-readable medium, or may be provided via a signal or other transient means via the communications interface (630).

Interconnection via the communication infrastructure (605) allows the central processor (610) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, and the like) may couple to the electronic device (600) either directly or via an I/O controller (635). These components may be connected to the electronic device (600) by any number of means known in the art, such as a serial port. One or more monitors (645) may be coupled via a display or video adapter (640) to the electronic device (600).

Figure 7:
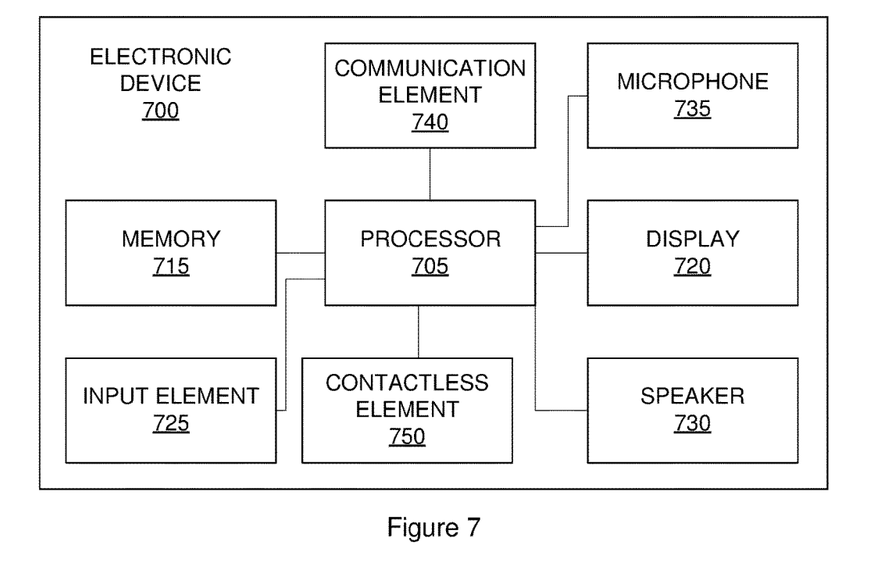
FIG. 7 shows a block diagram of an electronic device that may be used in embodiments of the disclosure.

FIG. 7 shows another embodiment of a block diagram of an electronic device (700) in the form of a communication component. The various participants and elements in the previously described system diagrams, for example any device with a touch sensitive display such as a tablet computer, phablet, control panel of machinery or equipment or the like may use any suitable number of subsystems or components of the electronic device (700). The electronic device (700) may be a cell phone, a feature phone, a smart phone, a satellite phone, or an electronic device having a phone capability.

The electronic device (700) may include a processor (705) (e.g., a microprocessor) for processing the functions of the electronic device (700) and a display (720) to allow a user to see the phone numbers and other information and messages. The electronic device (700) may further include an input element (725) to allow a user to input information into the device (e.g., input buttons, touch screen, etc.), a speaker (730) to allow the user to hear voice communication, music, etc., and a microphone (735) to allow the user to transmit his or her voice through the electronic device (700). The processor (710) of the electronic device (700) may connect to a memory (715). The memory (715) may be in the form of a computer-readable medium that stores data and, optionally, computer-executable instructions.

The electronic device (700) may also include a communication element (740) for connection to communication channels (e.g., a cellular telephone network, data transmission network, Wi-Fi™ network, satellite-phone network, Internet network, Satellite Internet Network, etc.). The communication element (740) may include an associated wireless transfer element, such as an antenna. The communication element (740) may include a subscriber identity module (SIM) in the form of an integrated circuit that stores an international mobile subscriber identity and the related key used to identify and authenticate a subscriber using the electronic device (700). One or more subscriber identity modules may be removable from the electronic device (700) or embedded in the electronic device (700).

The electronic device (700) may further include a contactless element (750), which is typically implemented in the form of a semiconductor chip (or other data storage element) with an associated wireless transfer element, such as an antenna. The contactless element (750) may be associated with (e.g., embedded within) the electronic device (700) and data or control instructions transmitted via a cellular network may be applied to the contactless element (750) by means of a contactless element interface (not shown). The contactless element interface may function to permit the exchange of data and/or control instructions between mobile device circuitry (and hence the cellular network) and the contactless element (750). The contactless element (750) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth™, infra-red, or other data transfer capability that can be used to exchange data between the electronic device (700) and an interrogation device. Thus, the electronic device (700) may be capable of communicating and transferring data and/or control instructions via both a cellular network and near field communications capability.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A display and interaction method in a user interface that includes a touch-sensitive display and is capable of tracking position or movement of a pointer along a z-axis that extends normally from the display, the method comprising the steps of:
- displaying an interactive item on the display;
- receiving a selection of the interactive item by the pointer touching the display;
- tracking the position or the movement of the pointer along the z-axis relative to the selected interactive item;
- responsive to the pointer crossing a first threshold at a certain distance from the display along the z-axis and the direction of movement of the pointer reversing so that the pointer moves closer to the display, initiating display of at least one additional selectable option associated with the interactive item; and
- responsive to the pointer crossing a selection threshold at a different certain distance along the z-axis, selecting the interactive item without selecting any additional selectable option; wherein the first threshold is closer to the display than the selection threshold.

2. The method in a user interface as claimed in claim 1 wherein the position of the pointer relates to a distance from the display.

3. The method in a user interface as claimed in claim 1 wherein the movement relates to a direction towards or away from the display.

4. The method as claimed in claim 1 including:
- in response to the pointer staying within the selection threshold distance, enabling the selection of the one or more additional selectable options.

5. The method as claimed in claim 1, wherein, selection of the additional selectable option is made by touching of the pointer to the display at the displayed option.

6. The method as claimed in claim 1, including dynamically resizing or repositioning the interactive item responsive to the position of the pointer along the z-axis.

7. The method as claimed in claim 1, wherein the size or position of the interactive item reaches a maximum size or final position once the pointer has crossed the first threshold, so as to provide a user of the user interface with intuitive feedback as to when the first threshold has been crossed.

8. The method as claimed in claim 1, wherein a second interaction mode is entered once the display of the at least one additional selectable option has been initiated, the second interaction mode enabling the selection of the one or more additional selectable option without the disappearance of the additional selectable options when the position of the pointer along the z-axis crosses the first threshold in either direction.

9. The method as claimed in claim 8, wherein a display function is provided when the second interaction mode has been entered wherein a movement of the pointer in a direction along an x-y plane of the display causes the additional selectable options to move in the opposite direction on the display so that an additional selectable option can be reached for selection with a relatively small movement in the x-y plane.

10. The method as claimed in claim 1, wherein the additional selectable options are dynamically updated in response to the pointer moving along the z-axis away from the display.

11. A user interface comprising:
- a touch-sensitive display that includes a display component for displaying an interactive item on the touch-sensitive display;
- a z-axis tracking component that is capable of tracking position or movement of a pointer along a z-axis that extends normally from the display;
- a touch sensitive input receiving component that receives a selection of the interactive item by the pointer touching the touch-sensitive display;
- a display initiating component; and
- a selection component;
- wherein, responsive to the pointer crossing a first threshold at a certain distance from the display along the z-axis relative to the selected interactive item and the direction of movement of the pointer reversing so that the pointer moves closer to the display, the display initiating component initiates display of at least one additional selectable option associated with the interactive item and responsive to the pointer crossing a selection threshold at a different certain distance along the z-axis, the selection component selects the interactive item without selecting any additional selectable option, wherein the first threshold is closer to the touch-sensitive display than the selection threshold.

12. A computer program product providing a display and interaction method in a user interface that includes a touch-sensitive display and is capable of tracking position or movement of a pointer along a z-axis that extends normally from the display, the computer program product comprising a non-transitory computer-readable medium having stored computer-readable program code, the computer-readable program code executable by a processing circuit to perform the steps of:
- displaying an interactive item on the display;
- receiving a selection of the interactive item by the pointer touching the display;
- tracking the position or movement of the pointer along the z-axis relative to the selected interactive item;
- responsive the pointer crossing a first threshold at a certain distance from the display along the z-axis and the direction of movement of the pointer reversing so that the pointer moves closer to the display, initiating display of at least one additional selectable option associated with the interactive item; and
- responsive to the pointer crossing a selection threshold at a different certain distance along the z-axis, selecting the interactive item without selecting any additional selectable option; wherein the first threshold is closer to the display than the selection threshold.

* * * * *